United States Patent
Hanlon et al.

(10) Patent No.: US 9,440,735 B2
(45) Date of Patent: Sep. 13, 2016

(54) AIRCRAFT ELECTRIC BRAKE ACTUATION SYSTEM AND METHOD

(75) Inventors: Casey Hanlon, Queen Creek, AZ (US); James Neil Quitmeyer, Chandler, AZ (US); Allan Blunt, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 1792 days.

(21) Appl. No.: 12/693,088

(22) Filed: Jan. 25, 2010

(65) Prior Publication Data
US 2013/0297101 A1 Nov. 7, 2013

(51) Int. Cl.
B64C 25/44 (2006.01)
B60T 8/17 (2006.01)
B60T 13/74 (2006.01)

(52) U.S. Cl.
CPC ............. *B64C 25/44* (2013.01); *B60T 8/1703* (2013.01); *B60T 13/741* (2013.01)

(58) Field of Classification Search
USPC ............................. 303/20, 89, 126; 188/265
See application file for complete search history.

(56) References Cited

U.S. PATENT DOCUMENTS

| | | | |
|---|---|---|---|
| 7,617,721 B2 | 11/2009 | McKeown et al. | |
| 2003/0214185 A1* | 11/2003 | Kinder et al. | 303/192 |
| 2006/0152080 A1* | 7/2006 | Chico et al. | 303/191 |
| 2006/0184306 A1* | 8/2006 | Kolberg | 701/70 |
| 2006/0186736 A1* | 8/2006 | DeVlieg et al. | 303/126 |
| 2006/0226698 A1* | 10/2006 | Riebe et al. | 303/20 |
| 2008/0084109 A1 | 4/2008 | Griffith et al. | |
| 2008/0133073 A1 | 6/2008 | Griffith et al. | |
| 2008/0150353 A1* | 6/2008 | Griffith et al. | 303/126 |
| 2011/0198163 A1* | 8/2011 | Hanlon et al. | 188/72.8 |

FOREIGN PATENT DOCUMENTS

| | | |
|---|---|---|
| EP | 1 867 539 A2 | 12/2007 |
| WO | 2005001303 A2 | 1/2005 |
| WO | 2008105813 A2 | 9/2008 |

OTHER PUBLICATIONS

Reply to communication from the Examining Division, for EP Application No. 11150347.0, dated Aug. 23, 2011, 12 pages.
European Examination Report from corresponding EP Application No. 11150347.0, mailed Apr. 27, 2011, 4 pages.
European Search Report from corresponding EP Application No. 11150347.0, mailed Apr. 18, 2011, 3 pages.
Examination Report from counterpart European Patent Application No. 11150347.0, dated Nov. 21, 2014, 3 pp.
Response to Examination Report dated Nov. 21, 2014, from counterpart European Patent Application No. 11150347.0, dated Mar. 20, 2015, 9 pp.

* cited by examiner

*Primary Examiner* — Thomas Irvin
(74) *Attorney, Agent, or Firm* — Shumaker & Sieffert, P.A.

(57) ABSTRACT

A system and method of controlling aircraft brakes in an aircraft that includes a brake pedal and an electric brake actuator. An aircraft operational state is determined and an application force that is supplied to the brake pedal is determined. When the determined aircraft operational state is a ground-idle state and the determined application force is greater than a set force magnitude, an actuator brake is moved to engage the electric brake actuator and the electric brake actuator is de-energized.

20 Claims, 3 Drawing Sheets

AIRCRAFT ELECTRIC BRAKE ACTUATION SYSTEM AND METHOD

TECHNICAL FIELD

The present invention generally relates to aircraft brake actuation systems and, more particularly, to an electric brake actuation system and method that reduces the duty cycle of the electric actuators, thereby reducing the sizes of the associated motors and controllers.

BACKGROUND

When a jet-powered aircraft lands, the aircraft brakes, various aerodynamic drag sources (e.g., flaps, spoilers, etc.), and, in many instances, aircraft thrust reversers, are used to slow the aircraft down in the desired amount of runway distance. Once the aircraft is sufficiently slowed, and is taxiing from the runway toward its ground destination, the aircraft brakes are used slow the aircraft, and bring it to a stop at its final ground destination.

Presently, many aircraft brake systems include a plurality of hydraulic or electromechanical actuators, and a plurality of wheel mounted brakes. The brakes in many aircraft are implemented as multi-disk brakes, which include a plurality of stator disks and rotor disks. The stator disks and rotor disks may be alternately splined to a torque tube or wheel rim, and disposed parallel to one another, to form a brake stack. The actuators, in response to an appropriate pilot-initiated command, move between an engage position and a disengage position. In the engage position, the actuators each engage a brake stack, moving the brake disks into engagement with one another, to thereby generate the desired braking force.

As was noted above, the actuators used in some aircraft brake systems may be electromechanical actuators. An electromechanical actuator typically includes an electric motor and an actuator. The electric motor may supply a rotational drive force to the actuator, which converts the rotational drive force to translational motion, and thereby translate, for example, between a brake engage position and a brake disengage position.

When the aircraft is taxiing and has to be held against idle engine thrust, the pilot may need to apply the brakes for extended periods of time. Current electric brake implementations do not have a mechanism to limit the commanded force on the brake stack or prevent the pilot from applying high brake forces for indefinite periods of time. As a result, the motors and associated motor controllers are typically oversized.

Hence, there is a need for a system and method for minimizing the duty cycle of the electric actuators in aircraft electric brake systems. The present invention addresses at least this need.

BRIEF SUMMARY

In one exemplary embodiment, a method of controlling aircraft brakes in an aircraft that includes a brake pedal and an electric brake actuator includes determining an aircraft operational state and determining an application force supplied to the brake pedal. When the determined aircraft operational state is a ground-idle state and the determined application force is greater than a set force magnitude, an actuator brake is moved to engage the electric brake actuator and the electric brake actuator is de-energized.

In another exemplary embodiment, an electric brake control system for an aircraft includes an electric brake actuator, an actuator brake, and a control circuit. The electric brake actuator is configured to be controllably energized and, upon being controllably energized, to move to a brake position. The actuator brake is configured to move between an engage position, in which the actuator brake prevents movement of the electric brake actuator, and a disengage position, in which the actuator brake does not prevent movement of the electric brake actuator. The control circuit is adapted to receive one or more signals representative of aircraft operational state and one or more signals representative of a brake pedal application force. The control circuit is configured, in response to these signals, to command the actuator brake to the engage position and to de-energize the electric brake actuator when the aircraft operational state is a ground-idle state and the application force is greater than a set force magnitude.

In still another exemplary embodiment, an electric brake control system for an aircraft includes a plurality of electric brake actuators, a plurality of actuator brakes, and a control circuit. Each electric brake actuator is configured to be controllably energized and, upon being controllably energized, to move to a brake position. Each actuator brake is configured to move between an engage position, in which the actuator brake prevents movement of an electric brake actuator, and a disengage position, in which the actuator brake does not prevent movement of an electric brake actuator. The control circuit coupled to receive one or more signals representative of a brake pedal application force and one or more signals representative of aircraft operational state. The control circuit is configured, in response to the one or more signals representative of brake pedal application force and one or more aircraft operational state signals, to determine the aircraft operational state, determine a brake pedal application force supplied to the brake pedals, and command the actuator brakes to the engage position and to de-energize the electric brake actuators when that the aircraft operational state is a ground-idle state and the brake pedal application force is greater than a set force magnitude.

Other desirable features and characteristics of the present invention will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
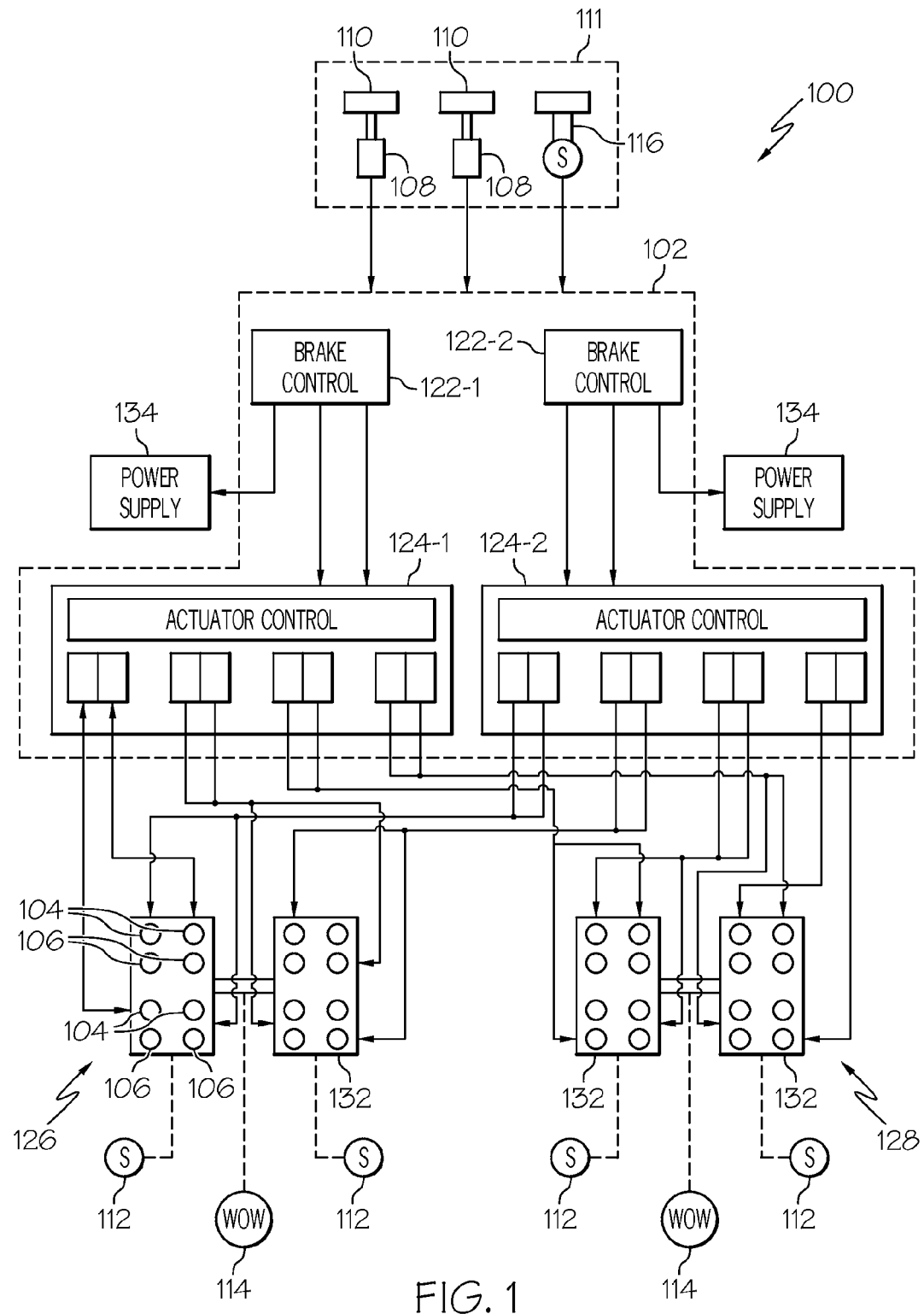
FIG. 1 depicts a functional block diagram of an exemplary embodiment of aircraft brake actuation system.

Turning now to the description, and with reference first to FIG. 1, a functional block diagram of an exemplary aircraft brake actuation system 100 is shown. In the depicted embodiment, the system 100 includes a control circuit 102, a plurality of electric brake actuators 104, and a plurality of actuator brakes 106. The control circuit 102 receives brake command signals that are representative of a desired brake force. The brake command signals are supplied from, for example, brake pedal transducers 108 that are coupled to brake pedals 110 located in an aircraft cockpit 111. The brake pedal transducers 108 are preferably implemented using position sensors, which provide position signals representative of the position of the brake pedals 110. The control circuit 102, using the position signals and the known spring rate of a return spring (not illustrated) coupled to the brake pedals 110, calculates the application force a pilot is supplying to the brake pedals 110. It will be appreciated that the brake pedal transducers 108 may be implemented using any one of numerous types of position sensors now known or developed in the future. In a particular embodiment, LVDT (linear variable differential transformer) position sensors are used. Moreover, other types of sensors, such as force sensors, could also be used if desired.

The control circuit 102 also receives one or more signals representative of aircraft operational state. The number and type of sensors used to supply the one or more signals representative of operational state may vary. In the depicted embodiment the sensors include one or more wheel speed sensors 112, one or more weight-on-wheels sensors 114, and one or more throttle position sensors 116. The one or more wheel speed sensors 112 are each configured to sense the rotational speed of an aircraft wheel 132 and supply a wheel speed signal representative thereof. The one or more weight-on-wheels sensors 114 are each configured to sense when the aircraft is on the ground (or other surface) and supply a signal representative thereof. The one or more engine throttle position sensors 116 are each configured to sense the position of the aircraft engine throttle and supply an engine throttle position signal representative thereof. It will be appreciated that the wheel speed sensors 112, the weight-on-wheels sensors 114, and the engine throttle position sensors 116 may be implemented using any one of numerous types of sensors now known or developed in the future.

The control circuit 102 is configured to process the brake command signals supplied from the brake pedal transducers 108, and controllably energize the electric brake actuators 104 to move to a brake position that corresponds to the commanded brake force. The control circuit 102 is also configured to process the brake command signals to determine when the brake pedal application force supplied from the pilot exceeds a set force magnitude and, upon exceeding the set force magnitude, when the brake pedal application force is less than a reset force magnitude. The control circuit 102 is additionally configured to process the one or more signals representative of aircraft operational state to determine when the aircraft is in a ground-idle state. The control circuit 102, based on these determinations, selectively supplies actuator brake commands to the actuator brakes 106 and selectively de-energizes and re-energizes the electric brake actuators 104. This latter functionality will be described in more detail further below.

Before proceeding further, it is noted that the term "ground-idle state," as used herein, means that the aircraft is on the ground (or other surface), the aircraft is stationary (or at least moving at less than a predetermined speed), and the aircraft engines are in an idle running state. The engines may be in an idle running state when, for example, the engine throttles are positioned to a ground-idle position. It will be appreciated, however, that various other engine throttle positions could be used to indicate that the aircraft engines are in an idle running state.

Returning now to the system description, it will be appreciated that the control circuit 102 may be variously configured to implement the functionality described above. In the depicted embodiment, however, the control circuit 102 includes a plurality of brake controls 122 and a plurality of actuator controls 124. Each brake control 122 is coupled to receive the one or more operational state signals and the brake command signals and is configured, in response to these signals, to supply actuator commands, the friction brake commands, and power enable/disable commands. In a particular preferred embodiment, the brake controls 122 translate the calculated brake pedal application forces to command force levels for the electric brake actuators 104. In the depicted embodiment, the control circuit 102 includes two brake controls 122-1, 122-2 to provide suitable redundancy. It will be appreciated, however, that the control circuit 102 could be implemented with more or less than this number of brake controls 122.

The actuator controls 124 are each coupled to receive the actuator commands and are each configured, in response to the actuator commands, to controllably energize a plurality of the electric brake actuators 104 to move to a brake position that corresponds to the commanded brake force. In the depicted embodiment, the control circuit 102 includes two multi-channel actuator controls 124-1, 124-2 to provide suitable redundancy. The number of channels in each actuator control 124 may vary depending, for example, on the number of electric brake actuators 104. This is because each channel in an actuator control 124 is preferably associated a single electric brake actuator 104. In the depicted embodiment, the system 100 is configured to be used with an aircraft that includes a left landing gear 126 and a right landing gear 128, with each landing gear having two wheels 132—an inboard wheel and an outboard wheel. The system 100 is additionally configured so that four electric brake actuators 104 are associated with each wheel 132, and all four of the electric brake actuators 104 associated with the same wheel 132 apply a brake force to the same brake stack. There is one actuator brake 106 associated with each actuator 104. Thus, the system 100, at least in the depicted embodiment, includes a total of sixteen electric brake actuators 104 and sixteen actuator brakes 106, and each actuator control 124 includes eight channels for a total of sixteen channels. It will be appreciated that this is merely exemplary of a particular embodiment, and that the system 100 could be configured to include more or less than this number of electric brake actuators 104 and actuator brakes 106 and, concomitantly, channels per actuator control 124.

In addition to the redundancy provided via the plurality of actuator controls 124, the system 100 provides further redundancy by, as depicted in FIG. 1, coupling half of the electric brake actuators 104 associated with each wheel 132 to two channels in different actuator controls 124. For example, it is seen that two of the electric brake actuators 104 associated with the outboard wheel 132 of the left landing gear 126 are coupled to two independent channels in one actuator control 124-1, and the other two electric brake actuators 104 are coupled to two independent channels in the other actuator control 124-2. In this manner, even in the unlikely event one of the actuator controls 124 becomes inoperable, there will remain at least two operable electric brake actuators 104 associated with each wheel 132.

It will be appreciated that the control circuit 102 may be implemented using one or more general purpose processors, content addressable memory, digital signal processors, application specific integrated circuits, field programmable gate arrays, any suitable programmable logic devices, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

No matter how the control circuit 102 is specifically implemented, each electric brake actuator 104 is configured, upon being controllably energized, to move to a brake position that corresponds to the commanded brake force, to thereby supply the desired brake force to its associated wheel 132. Moreover, the friction brakes 106 are each configured, in response to the friction brake commands supplied by the control circuit 102, to selectively move to an engage position or a disengage position to engage or disengage, respectively, one of the electric brake actuators 104. In the engage position, each friction brake 106 holds its associated electric brake actuators 104 in the last commanded brake position.

As FIG. 1 additionally depicts, the system 100 may also include one or more power supplies (or power converters) 134. The power supplies 134 preferably provide electrical power to various portions of the control circuit 102, such as the actuator controls 124. The power supplies 134 are configured, in response to the power enable/disable signals supplied from the brake controls 122, to selectively remove electrical power from, and subsequently restore electrical power to, the actuator controls 124. The circumstances under which the control circuit 102 commands the power supplies 134 to remove electrical power from and subsequently restore electrical to the actuator controls 124 will be described in more detail further below.

Figure 2:
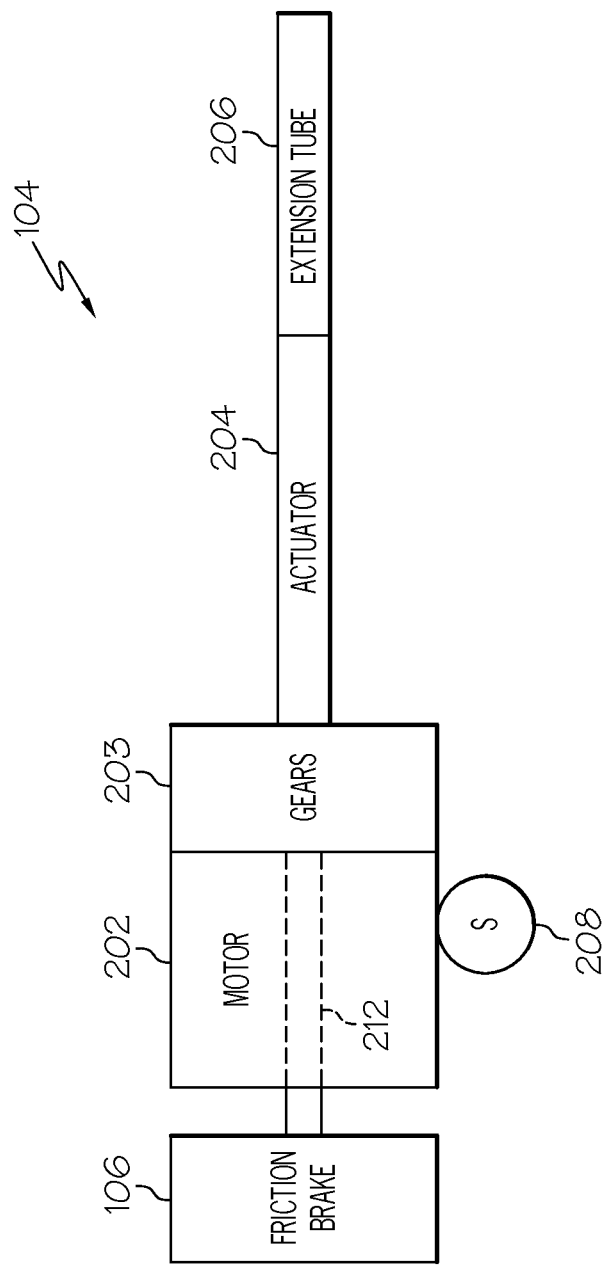
FIG. 2 depicts a simplified representation of an exemplary physical embodiment of an electric brake actuator that may be used with the exemplary system of FIG. 1.

Turning now to FIG. 2, a simplified representation of an exemplary physical embodiment of an electric brake actuator 104 that may be used with the system 100 is shown and will now be briefly described. The depicted electric brake actuator 104 is an electromechanical actuator that includes a motor 202, an actuator 204, an extension tube (or RAM) 206, and a position sensor 208. The motor 202 receives the brake force actuator command signals from the control circuit 102 and, in response, rotates in the commanded direction to supply a rotational drive force. The motor 202 may be any one of numerous types of electric motors, but in a particular preferred embodiment it is implemented as a brushless DC motor. No matter the particular type of motor 202 that is used, the rotational drive force is supplied to the actuator 204, preferably via one or more gears 203.

The actuator 204 is coupled to receive the rotational drive force from the motor 202 and, in response thereto, to translate to a position that corresponds to the commanded brake force. The actuator 204 may be any one of numerous actuators that exhibit this functionality, but in a particular preferred embodiment the actuator 204 is a ballscrew-type actuator. As is generally known, a ballscrew actuator typically includes an inner, externally-threaded ballscrew, and an external, internally-threaded ballnut, neither of which is illustrated. A plurality of balls, which are also not illustrated, are disposed in the threads between the ballscrew and ballnut.

The ballscrew-type actuator 204 converts the rotational drive force received from the motor 202 to translational motion in one of two ways, depending upon its configuration. In a first configuration, the ballscrew is configured to rotate and receives the rotational drive force from the motor, and the ballnut is anti-rotated. Thus, upon receipt of the rotational drive force, the ballscrew will rotate and the ballnut will translate. In a second configuration, the ballscrew is configured to translate, and the ballnut, while being fixed axially, is configured to rotate and receives the rotational drive force from the motor. Thus, upon receipt of the rotational drive force, the ballnut will rotate and the ballscrew will translate. It will be appreciated that these two ballscrew-type actuator configurations are merely exemplary, and that various other configurations may be used. It will be appreciated that in either configuration, one or the other of the ballnut or ballscrew is anti-rotated.

The cap assembly 206 is coupled to an end of, and translates with, the actuator 204. The cap assembly 206 engages an aircraft brake stack (not shown) in its associated wheel 132, and supplies the commanded brake force thereto.

The position sensor 208 is configured to sense the position of the actuator 204 and supply an actuator position signal representative thereof to the control circuit 102. It will be appreciated that the position sensor 208 may sense actuator position in any one of numerous ways, using any one of numerous types of sensors. For example, the position sensor 208 could sense actuator position directly using, for example, a magnetic sensor, an optic sensor, or a resistive type sensor. In the depicted embodiment, however, the position sensor 208 is implemented as a resolver that senses the rotational position of the motor 202, which corresponds to actuator position. The actuator position signal supplied by the position sensor 208 is fed back to the control circuit 102, where it is used to control the position of, and thus the force supplied by, the electric brake actuator 104. It will be appreciated that the use of a position sensor to control the supplied force by position is merely exemplary, and that it can also be controlled based on other parameters, such as motor stall current. In any case, actuator travel relates to the supplied force, when the RAM 208 is in contact with the brake stack as a result of brake assembly compliance. Thus, using the actuator brakes to clamp the motor shaft results in holding the actuator to maintain the same brake force after the actuator is de-energized.

As FIG. 2 additionally depicts, an actuator brake 106 is coupled to each electric brake actuator 104, and when the actuator brake 106 is in its engage position it prevents rotation of its associated electric actuator 104. In the depicted embodiment, the actuator brake 106 is coupled to the electric actuator 104 and, in its engage position, prevents rotation of the motor shaft 212 due to the back drive force applied to the electric actuator 104 by a compressed brake stack. Conversely, when the actuator brake 106 is in the disengage position, the motor shaft 212 may be rotated. It will be appreciated, however, that the electric brake actuators 104 and actuator brakes 106 are sized such that the electric brake actuators 104 can, when commanded, move against the brake force supplied by the associated actuator brakes 106. The actuator brakes 106 may be variously configured to implement its functionality. In one particular embodiment, the actuator brakes 106 are configured as solenoid-operated, power-off devices. These devices are configured such that the actuator brakes 106 are springloaded to the engage position when power is not supplied to the solenoid, and are moved to the disengage position, against spring force, when power is supplied to the solenoid. It will be appreciated that this is merely one example configuration of the actuator brakes 106. In other embodiments, the actuator brakes 106 could be hydraulically operated, or other types of electrically operated devices, such as bistable devices that only require a momentary pulse to change states from engage to disengage and vice-versa. Moreover, the actuator brakes 106 could be configured to selectively engage other portions of the electric brake actuator 104.

Figure 3:
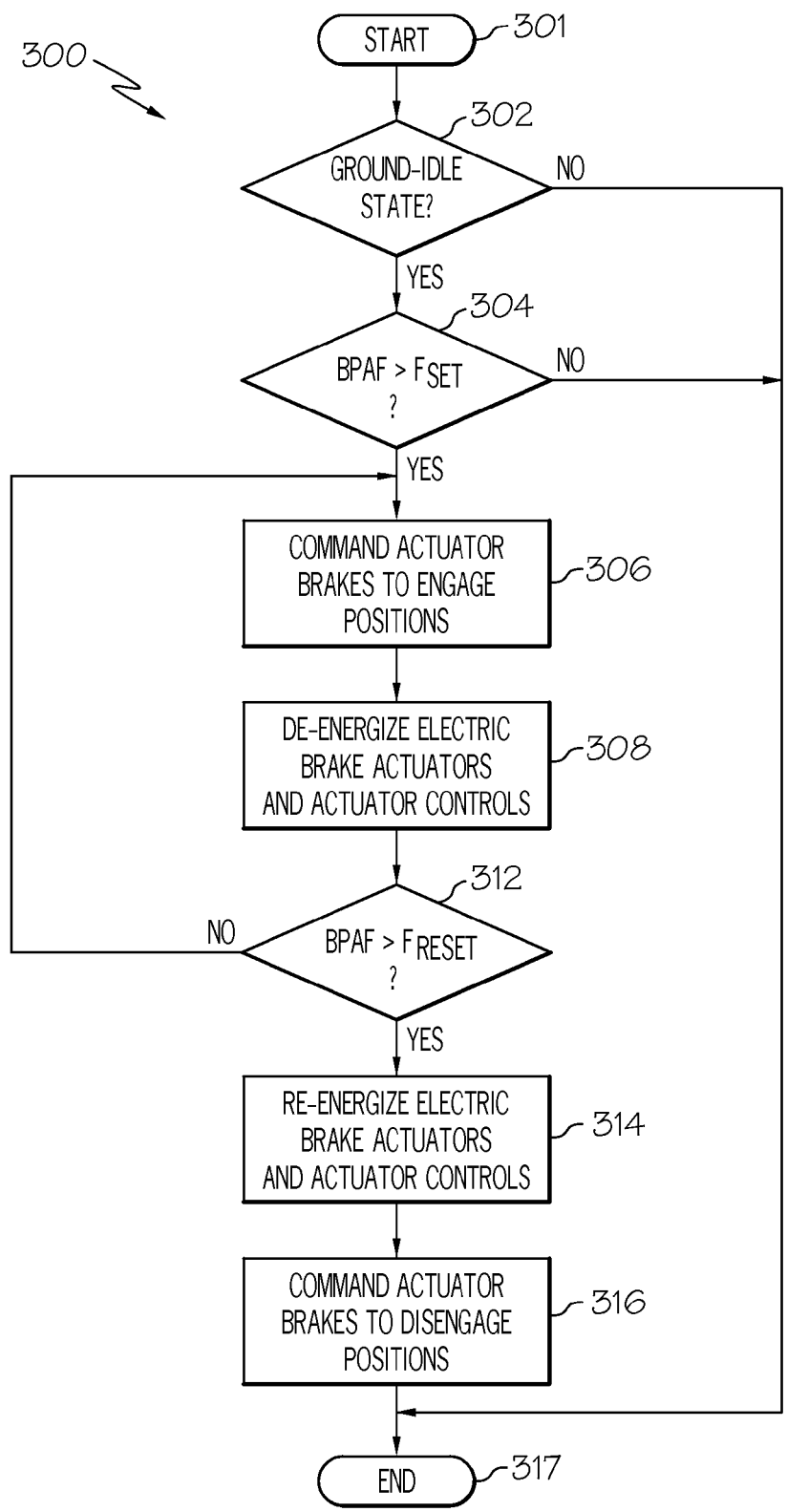
FIG. 3 depicts a process, in flowchart form, that may be implemented in the exemplary system of FIG. 1 for minimizing the duty cycle of electric brake actuators.

It was noted above that the control circuit 102, in addition to supplying the brake actuator command signals, selectively supplies friction brake commands to the friction brakes 106 and selectively de-energizes and re-energizes the electric brake actuators 104. An embodiment of a process 300 that may be implemented by the control circuit 102 to carry out this function is depicted, in flowchart form, in FIG. 3, and with reference thereto will now be described. In doing so, it is noted that parenthetical reference numerals in the following description refer to like-numbered flowchart blocks in FIG. 3, and that non-parenthetical reference numerals refer to elements described above in connection with FIG. 1. Moreover, various portions of the process 300 may be performed by different elements of the described system 100. It should additionally be appreciated that process 300 may include any number of additional or alternative process steps, at least some of the process steps need not be performed in the illustrated order, and the process 300 may be incorporated into a more comprehensive procedure or process having additional functionality not described in detail herein.

When the process 300 is initiated, the control circuit 102 first determines the aircraft operational state. In particular, the control circuit 102 determines whether the aircraft is in the ground-idle state (302). If the aircraft is not in the ground-idle state, then the process ends (317). If, however, the aircraft is in the ground-idle state, then the control circuit 102 determines whether the brake pedal application force (BPAF) that is being supplied to the aircraft brake pedals 110 exceeds the set force magnitude ($F_{SET}$) (304). If the brake pedal application force does not exceed the set force magnitude, then the process ends (317). If the brake pedal application force does exceed the set force magnitude, then this, together with the determination that the aircraft is in the ground-idle state, indicates that the pilot is applying the brakes to prevent aircraft movement at the current engine throttle setting.

In the next process step (306), the control circuit 102 commands the actuator brakes 106 to move to their respective engage positions. As noted above, at least in a particular preferred embodiment, this is done by de-energizing the actuator brakes 106. Then, after the actuator brakes 106 are moved to the engage positions (306), the control circuit 102 de-energizes the electric brake actuators 104 (308). Though not depicted in FIG. 3, it will be appreciated that the actuator controls 124 are also preferably de-energized. As noted above, this may be accomplished by commanding the actuator controls 124 to remove electrical power from the electric brake actuators 104. The electric brake actuators 104 are configured to be "de-energized fixed," which means the electric brake actuators 104, when de-energized, are configured to remain in their last commanded positions. However, because the brake stacks have mechanical stiffness, each acts as a relatively stiff spring. Once the electric brake actuators 104 are de-energized, the brake stacks will want to expand and back drive the brake actuators 104. The actuator brakes 106, as described above, preferably engage the electric brake actuators 104 and prevent the brake stacks from back driving the brake actuators 104 from their last commanded positions.

The actuator brakes 106 remain in the engage positions and the electric brake actuators 104 remain de-energized until the control circuit 102 determines that the brake pedal application force (BPAF) being supplied to the aircraft brake pedals 110 is less than the reset force magnitude ($F_{RESET}$) (312). This indicates that the pilot is releasing the force that was being supplied to the brake pedals 110 to, in most likelihood, allow the aircraft to move forward. Thus, when the brake pedal application force (BPAF) is less than the reset force magnitude ($F_{RESET}$), the control circuit 102 re-energizes the electric brake actuators 104 (314) and commands the actuator brakes 106 to the disengage positions (316).

An aircraft electric brake system and method are described herein that reduces the duty cycle of the electric brake actuators and actuator controls. As a result, the system may be implemented using relatively smaller actuator motors and/or actuator controls.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:
   determining an aircraft operational state;
   measuring an application force supplied to a brake pedal of an aircraft; and
   moving an actuator brake to engage an electric brake actuator and de-energizing the electric brake actuator when (i) the determined aircraft operational state is a ground-idle state, wherein the ground-idle state is a state in which the aircraft is moving, and (ii) the measured application force is greater than a set force magnitude.

2. The method of claim 1, further comprising:
   disengaging the actuator brake and re-energizing the electric brake actuator when the application force is less than a reset force magnitude.

3. The method of claim 1, wherein determining the aircraft operational state comprises measuring aircraft wheel speed.

4. The method of claim 1, wherein determining the aircraft operational state comprises detecting that the aircraft is on a surface.

5. The method of claim 1, wherein the aircraft further includes an engine throttle, and wherein determining the aircraft operational state comprises determining an engine throttle position of the engine throttle.

6. The method of claim 1, wherein the ground-idle state is a state in which the aircraft is moving at less than a predetermined speed.

7. An electric brake control system for an aircraft, the electric brake control system comprising:
an electric brake actuator configured to be controllably energized and, upon being controllably energized, to move to a brake position;
an actuator brake configured to move between an engage position, in which the actuator brake prevents movement of the electric brake actuator, and a disengage position, in which the actuator brake does not prevent movement of the electric brake actuator; and
a control circuit configured to receive one or more signals representative of aircraft operational state and one or more signals representative of a brake pedal application force, the control circuit being configured to, in response to the one or more signals representative of aircraft operational state and the one or more signals representative of a brake pedal application force, command the actuator brake to the engage position and to de-energize the electric brake actuator when the aircraft operational state is a ground-idle state and the application force is greater than a set force magnitude, wherein the ground-idle state is a state in which the aircraft is moving.

8. The system of claim 7, wherein the control circuit is further configured to command the actuator brake to the disengage position and re-energize the electric brake actuator when the brake pedal application force is less than a reset force magnitude.

9. The system of claim 8, wherein the control circuit comprises:
an actuator control coupled to receive actuator commands and configured, in response thereto, to controllably energize the electric brake actuator; and
a brake control coupled to receive the one or more signals representative of aircraft operational state and the one or more signals representative of the brake pedal application force, the brake control being configured to, in response to the one or more signals representative of aircraft operational state and the one or more signals representative of the brake pedal application force:
(i) supply the actuator commands to the actuator control,
(ii) selectively command the actuator brake to the engage position and the disengage position, and
(iii) selectively de-energize the electric brake actuator.

10. The system of claim 7, wherein the actuator brake is coupled to the electric brake actuator and, in the engage position, engages the electric brake actuator to maintain the electric brake actuator in the brake position.

11. The system of claim 7, wherein the one or more signals representative of aircraft operational state include one or more of:
a sensor signal that indicates the aircraft is on a surface;
a wheel speed signal representative of aircraft wheel rotational speed; and
an engine throttle position signal representative of aircraft engine throttle position.

12. The system of claim 11, further comprising:
a weight-on-wheels sensor configured to sense when the aircraft is on the surface and to supply the sensor signal to the control circuit;
a wheel speed sensor configured to sense the aircraft wheel rotational speed and to supply the wheel speed signal to the control circuit;
a throttle position sensor configured to sense the aircraft engine throttle position and supply the engine throttle position signal to the control circuit.

13. The electric brake control system of claim 7, wherein the ground-idle state is a state in which the aircraft is moving at less than a predetermined speed.

14. An electric brake control system for an aircraft, the electric brake control system comprising:
a plurality of electric brake actuators, each electric brake actuator of the plurality of electric brake actuators being configured to be controllably energized and, upon being controllably energized, to move to a brake position;
a plurality of actuator brakes, each actuator brake of the plurality of actuator brakes being configured to move between an engage position, in which the actuator brake prevents movement of an electric brake actuator of the plurality of electric brake actuators, and a disengage position, in which the actuator brake does not prevent movement of the electric brake actuator; and
a control circuit coupled to receive one or more signals representative of a brake pedal application force and one or more signals representative of an aircraft operational state, the control circuit being configured to, in response to the one or more signals representative of the brake pedal application force and the one or more signals representative of the aircraft operational state:
(i) determine the aircraft operational state,
(ii) determine the brake pedal application force supplied to the brake pedals, and
(iii) command the plurality of actuator brakes to the engage position and de-energize the electric brake actuators when that the aircraft operational state is a ground-idle state and the brake pedal application force is greater than a set force magnitude, wherein the ground-idle state is a state in which the aircraft is moving at less than a predetermined speed.

15. The system of claim 14, wherein the control circuit is further configured to command the actuator brakes to the disengage position and re-energize the electric brake actuators when the brake pedal application force is less than a reset force magnitude.

16. The system of claim 15, wherein the control circuit comprises:
a plurality of actuator controls, each actuator control of the plurality of actuator controls being coupled to receive actuator commands and configured, in response thereto, to controllably energize the plurality of electric brake actuators to move to the brake position; and
a plurality of brake controls, each brake control of the plurality of brake controls being coupled to receive the one or more signals representative of an aircraft operational state and one or more signals representative of the brake pedal application force, each brake control being further configured to, in response to the one or more signals representative of aircraft operational state and the one or more signals representative of a brake pedal application force:
(i) supply the actuator commands to the plurality of actuator controls,
(ii) selectively command the plurality of actuator brakes to the engage position and the disengage position, and
(iii) selectively de-energize the plurality of electric brake actuators.

17. The system of claim 16, wherein:
the aircraft comprises at least a left landing gear and a landing gear wheel;
the landing gear wheel includes an inboard wheel and an outboard wheel;

at least one actuator brake of the plurality of actuator brakes and at least one electric brake actuator of the plurality of electric brake actuators are coupled to the inboard wheel;

at least one actuator brake of the plurality of actuator brakes and at least one electric brake actuator of the plurality of electric brake actuators are coupled to the outboard wheel; and the plurality of actuator controls are configured so that the at least one actuator brake of the plurality of actuator brakes and the at least one electric brake actuator of the plurality of electric brake actuators coupled to the inboard wheel apply a brake force to a same brake stack.

18. The system of claim 14, wherein each actuator brake of the plurality of actuator brakes is coupled to an electric brake actuator of the plurality of electric brake actuators, and, in the engage position, engages the electric brake actuator to maintain the electric brake actuator in the brake position.

19. The system of claim 14, further comprising:
a plurality of brake pedal sensors, each brake pedal sensor being configured to sense a brake pedal position and to transmit a position signal representative of the brake pedal position to the control circuit,
wherein the control circuit is configured to determine the brake pedal application force from the position signal.

20. The system of claim 14, further comprising:
a plurality of aircraft state sensors, wherein each aircraft state sensor is configured to supply a signal representative of the aircraft operational state to the control circuit.

* * * * *